United States Patent Office 2,901,397
Patented Aug. 25, 1959

2,901,397

11-OXYGENATED 9α-21-DIFLUORO-1,4 PREGNADIENE STEROIDAL COMPOSITIONS

Alexander L. Nussbaum, Bloomfield, N.J., assignor to Schering Corporation, Bloomfield, N.J., a corporation of New Jersey No Drawing. Application November 30, 1956
Serial No. 625,219
9 Claims. (Cl. 167—77)

The present invention relates to the manufacture of compounds characterized by a high degree of anti-inflammatory and glucocorticoid activity.

More particularly, the invention relates to the manufacture of 9α,21-difluoro-1,4-pregnadiene-16α,17α-diol-3,20-diones having in the 11-position a ketonic oxygen or a β-hydroxyl group.

It is the general object of the invention to provide improved adreno-corticoid compounds characterized by an increased anti-inflammatory and glucocorticoid activity as compared with cortisone and hydrocortisone and their 9α-fluoro derivatives, but in which the unfavorable side reactions of these known compounds are considerably reduced, as, for example, with respect to the salt-retention properties in the case of the 9α-fluoro compounds.

The compounds of the invention are embraced by the following general formula:

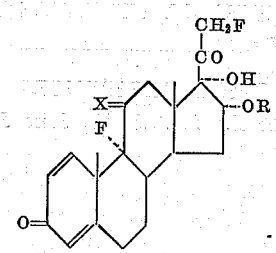

In this formula X stands for ketonic oxygen or (H,β—OH); while R is hydrogen or an acyl group which is not toxic in the dosages in which the drug is administered. While the lower alkanoyl radicals are preferred, such as acetic, propionic, butyric, and tertiary-butyl acetic acid radicals, the acyl group may also be that of other acids, like succinic, maleic, benzoic, salicylic, cyclopentyl and cyclohexyl acetic and propionic acids, and the like.

Suitable procedures for the preparation of the compounds of the invention are presented by way of illustration in the following examples:

EXAMPLE 1

A. *9α-fluoro-1,4-pregnadiene-11β,16α,17α,21-tetrol-3,20-21-tosylate*

600 mg. of 9α-fluoro-1,4-pregnadiene-11β,16α,17α,21-tetrol-3,20-dione (prepared as described, for example, by Bernstein et al., J.A.C.S. 78, page 5693, Nov. 5, 1956), is dissolved in 1 ml. of pyridine, and the solution frozen to a solid in Dry Ice-acetone mixture. A solution of 0.36 g. of p-toluenesulfonyl chloride in 3.5 ml. of methylene chloride was chilled to 10° C. and added to the frozen steroid pyridine solution. After leaving the liquid reaction mixture for two hours at −80° C. it is then stored at −18° for 20 hours, diluted with 31.5 ml. of ether and washed with dilute hydrochloric acid, sodium bicarbonate solution and finally water. The washed solution is finely dried with sodium sulfate and concentrated to dryness. Crystallization from acetone yields 570 mg. of the tosylate.

B. *9α-21-difluoro-1,4-pregnadiene-3,20-dione-11β,16α,17α-triol*

The foregoing 21-tosylate (500 mg.) is converted to its iodo derivative by dissolving it in 2.5 ml. of acetone and adding to the solution a solution of 0.5 g. of sodium iodide in 3.5 ml. of acetone. The solution is brought up to reflux temperature and the immediate formation of a dense, white precipitate is observed. After a total reflux period of 7 minutes, the mixture is cooled and concentrated in vacuo and 25 ml. of an approximately 50% aqueous sodium thiosulfate are added. The resulting suspension is filtered to yield 415 mg. of 9α-fluoro-21-iodo-1,4-pregnadiene-11β,16α,17α-triol-3,20-dione. The iodide is dissolved in 37.5 ml. of acetonitrile (10% aqueous), and 1.4 g. of silver fluoride in 5 ml. of water are added, and the resulting suspension is stirred overnight at room temperature. Stirring is then continued at 60° C. for 90 minutes and the suspension is concentrated to half its volume. A solution of 5 ml. of concentrated ammonia in 50 ml. of water is added and the resulting aqueous phase is thoroughly extracted with chloroform. The extract is washed with successive portions of sodium thiosulfate solution and concentrated to a residue. The residue is chromatographed over Florisil and there is eluted with benzene-ether a mixture of 16α,21- and 17α, 21-oxides. The more polar eluates (ether-methylene chloride, 3 to 1) are combined and recrystallized from acetone to give 187 mg. of 9α,21-difluoro-1,4-pregnadiene-11β,16α,17α-triol-3,20-dione.

EXAMPLE 2

*9α,21-difluoro-1,4-pregnadiene-11β,16α,17α-triol-3,20-dione 16-acetate*

730 mg. of the triol of Example 1 are dissolved in 5 ml. pyridine and 2 ml. of acetic anhydride are added. The solution is left to stand for 18 hours at room temperature, with exclusion of moisture, and then poured onto 35 ml. of ice water. The reaction solid precipitate is filtered with suction and recrystallized from methanol to give 670 mg. of 9α,21-difluoro-1,4-pregnadiene-11β,16α,17α-triol-3,20-dione 16-acetate.

EXAMPLE 3

*9α,21-difluoro-1,4-pregnadiene-16α,17α-diol-3,11,20-trione 16-acetate*

300 mg. of the acetate of Example 2 are dissolved in 8 ml. of dry pyridine and cooled in ice. To the solution are added in several portions 160 mg. of N-bromoacetamide. The solution turns amber, then intensely yellow. It is left to stand overnight at 5° C. and has turned black by next morning. It is then poured into 40 ml. of a slush of dilute hydrochloric acid-ice (50 ml.), extracted with ethyl acetate, and the extract washed with dilute sodium bicarbonate solution and water, dried, concentrated, and the residue crystallized from ether to give 197 mg. of 9α,21-difluoro-1,4-pregnadiene-3,11,20-trione-16α,17α-diol 16-acetate.

EXAMPLE 4

*9α,21-difluoro-1,4-pregnadiene-16α,17α-diol-3,11,20-trione*

100 mg. of the acetate of Example 3 are dissolved in 5 ml. of methanol and placed under a nitrogen atmosphere. To the solution are added 10 mg. of sodium methoxide in 0.2 ml. of methanol. The reaction mixture is allowed to stand for 20 minutes at room temperature under nitrogen. To it is then added 1.2 ml. of a solution consisting of 3 ml. of methanol and 0.2 ml. of water. After another six minutes, 2 ml. of ice water are added, the mixture is concentrated under vacuum, poured into an ice water slush and eventually filtered. Recrystallization from acetone gives 67 mg. of 9α,21-difluoro-1,4-pregnadiene-16α,17α-diol-3,11,20-trione.

The compounds of the invention are preferably administered orally at dosages of about 3 to 10 mg. daily. The maintenance dose can be reduced to about 1 to 3 mg. per day.

The compounds can be marketed in the form of tablets containing any of the common, non-toxic carriers, like starches, sugars, gums, talc, calcium and magnesium carbonates, and the like.

I claim:

1. A compound of the formula

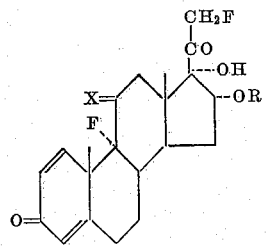

wherein X is a member of the class consisting of =O and (H,β—OH), and R is a member of the class consisting of H and lower alkanoyl.

2. A compound according to claim 1, wherein X is O and R is H.

3. A compound according to claim 1 wherein X is H,β—OH and R is H.

4. 9α,21-difluoro-1,4-pregnadiene-16α,17α-diol-3,11,20-trione 16-acetate.

5. 9α,21-difluoro-1,4-pregnadiene-11β,16α,17α-triol-3,20-dione 16-acetate.

6. A pharmaceutical composition comprising a non-toxic carrier and a compound as defined in claim 1.

7. Process for the manufacture of compounds of the formula

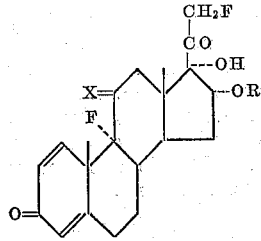

wherein X is a member of the class consisting of =O and (H,β—OH), and R is a member of the class consisting of H and lower alkanoyl, which comprises reacting a compound of the formula

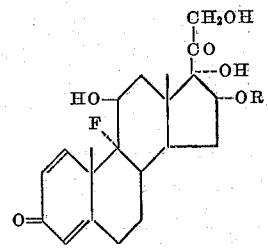

with p-toluenesulfonyl chloride, to form the 21-tosylate, reacting the 21-tosylate with an alkali metal iodide until the 21-iodide is produced, and reacting the iodide with silver fluoride to replace the iodine with fluorine.

8. Process according to claim 7, wherein the starting compound is dissolved in pyridine and the solution frozen to a solid, and wherein a chilled solution of p-toluenesulfonyl chloride is added to the frozen solid, after which the mixture is left at about −80° C.

9. Process according to claim 7, including the step of reacting the product with an oxidizing agent to convert the 11β—OH group to a keto group.

References Cited in the file of this patent

UNITED STATES PATENTS 2,789,118    Bernstein _____ Apr. 16, 1957

OTHER REFERENCES

Tannhauser et al.: J.A.C.S. 78, June 5, 1956, pages 2658–2659.